United States Patent [19]

Pierson

[11] Patent Number: 5,019,258

[45] Date of Patent: May 28, 1991

[54] HORIZONTAL BELT VACUUM FILTRATION APPARATUS

[75] Inventor: Henri G. W. Pierson, Tenerife, South Africa

[73] Assignee: D & C Limited, Monrovia, Liberia

[21] Appl. No.: 527,830

[22] Filed: May 24, 1990

[30] Foreign Application Priority Data

Jun. 2, 1989 [GB] United Kingdom ............. 8912742

[51] Int. Cl.$^5$ ............................................. B01D 33/60
[52] U.S. Cl. ................................... 210/258; 210/259; 210/396; 210/400; 210/406; 210/408; 210/772; 68/181 R
[58] Field of Search ............. 210/205, 208, 216, 259, 210/258, 261, 263, 391, 396, 400, 406, 407, 408, 772, 779, 783, 791; 162/60, 380; 68/181 R

[56] References Cited

U.S. PATENT DOCUMENTS

| | | | |
|---|---|---|---|
| 3,485,377 | 12/1969 | McKenzie | 210/400 |
| 3,870,641 | 3/1975 | Pierson | 210/400 |
| 4,123,360 | 10/1978 | Navalda | 210/219 |
| 4,139,465 | 2/1979 | Nordengren | 210/772 |
| 4,851,113 | 7/1989 | Evans | 210/400 |

FOREIGN PATENT DOCUMENTS 1562437 3/1980 United Kingdom .

Primary Examiner—W. Gary Jones
Assistant Examiner—Matthew O. Savage
Attorney, Agent, or Firm—Dennison, Meserole, Pollack & Scheiner

[57] ABSTRACT

In a vacuum belt filter, in order to allow for additional washing of filter cake, a plate is mounted in an inclined disposition above the upper run of the belt with its lower end directed upstream so that as the belt is progressed filter cake moves up over said plate. At the top of the plate, the cake drops into a receptacle and is washed and reslurried by liquid from jets before being returned to the belt downstream, preferably immediately below, the inclined plate. As an alternative to immediate return to the belt, reslurried cake may be transported from the receptacle to a reservoir for further washing or prolonged leaching before it is returned.

18 Claims, 4 Drawing Sheets

HORIZONTAL BELT VACUUM FILTRATION APPARATUS

TECHNICAL FIELD OF THE INVENTION

This invention concerns horizontal belt vacuum filtration apparatus of the kind comprising an endless filter belt guided to extend around a path including an upper run (which is horizontal or near horizontal) onto which is fed a slurry to be filtered, vacuum means which serves to draw filtrate through the belt, and means for progression of the belt.

BACKGROUND ART

In many industrial filtration processes it is desirable that a filter cake is subjected to a "washing" operation in order to remove traces of the original mother liquor or filtrate. For this purpose horizontal belt filters are often used to great advantage, since their horizontal surface presents an ideal configuration to effect "plug flow" washing. However, in some cases additional washing is desirable. Also, plug flow washing cannot be carried out efficiently in those cases where the residual mother liquor is held inside the particles which make up the cake, as may be the case for instance with fibrous material. In such cases a prolonged leaching operation is required, which in most cases is more dependent on contact time rather than on the quantity of liquor used. For this reason filter cake of this nature is normally discharged as a semi-washed cake and then subjected to a separate leaching operation, after which the leached slurry is passed over a second filter for removal of the leachate.

SPECIFIC PRIOR ART

U.S. Pat. No. 4,123,360 (Havalda) discloses horizontal belt vacuum filtration apparatus of the kind with which this invention is concerned wherein agitators in the form of rotatable shafts provided with radial vanes are arranged transversely above the belt upper run so that the vanes break up the filter cake formed thereon. These agitators are mounted within a cover which is open downwards towards the belt and are supplied with treatment liquid. Filter cake portions removed from the belt are carried around by the rotating vanes and subjected to the additional liquid before being redeposited upon the belt and carried along therewith as the belt progresses. Whilst this is useful in some applications it clearly does not allow for any prolonged contact with liquid for purposes of washing and leaching.

Also known is GB 1562437 which discloses apparatus wherein filter cake is removed by a downwardly sloping deflector plate at the downstream end of the upper run, directed thereby into separate apparatus where it is mixed with washing liquor and subjected to agitation, and subsequently deposited into a second belt for passage between said second belt and the lower run of the first belt.

OBJECT OF THE INVENTION

It is an object of the present invention to effect a constructionally simple addition to horizontal filter belt apparatus whereby filter cake can not only be removed from horizontal belt vacuum filtration apparatus to enable washing or leaching to take place but can be subsequently returned to the same filter for final dewatering.

SUMMARY OF THE INVENTION

Pursuant hereto, the invention provided horizontal belt vacuum filtration apparatus of the kind mentioned in the first paragraph above characterised in that a plate is mounted in inclined disposition above the upper run of the belt with its lower end directed upstream and lying on or closely adjacent the surface of the belt so that as the belt is progressed filter cake moves upwards over said plate, in that means for washing and reslurrying the cake, or means for transporting the cake to a reservoir are provided adjacent the upper end of the plate, and in that means are provided for returning re-slurried cake to the upper run of the filter belt downstream of said plate.

The plate is advantageously pivotally mounted such that its lower end rests on the belt. In this way, the plate will ride over any unevenness or incrustation on the belt, without "snagging" or risking damage to the belt.

To facilitate movement of filter cake onto the plate there should preferably be a gap in the vacuum means in the vicinity of the lower end of the plate. The cake will not then be strongly sucked down onto the belt in this region.

A suitable angle of inclination for the plate is approximately 10° to the horizontal, or relative to the upper run of the belt (which should in any event be near horizontal).

In one preferred embodiment of the apparatus of the invention, which can be used when additional cake washing is required, but not prolonged leaching, a receptacle (which may be termed a re-slurry trough) is located adjacent the upper end of the plate for the cake to drop into. Liquid jets are trained onto the cake in this receptacle to reslurry same, and means are provided to allow the new slurry to flow back onto the filter belt upper run behind, i.e. downstream of, the inclined plate.

Advantageously, a further inclined plate is arranged below the main plate to return the new slurry to the belt at a location underneath the main plate. In this way the belt upper run can be used for filtration purposes throughout its full extent, without any gap or clearance in the amount of slurry deposited thereon in the region below the main plate.

To facilitate washing, mixing, re-slurrying, the so-called slurry trough may advantageously be provided with baffle means or agitation means.

In another embodiment which is for use in the case of a requirement for prolonged leaching of the washed cake, duct means are provided to conduct the new slurry formed in the initial receptacle (slurry trough) to a separate reservoir, where it may be held for the requisite time before being pumped back and re-deposited on the belt behind the inclined plate. Agitation means may be provided in the aforesaid reservoir.

The basic proposal for an inclined plate, and the various optional features just referred to, can be applied equally well to intermittently operating apparatus, where the belt is progressed stepwise, alternate with operation of the vacuum means in the stationary phase, as to continuous filtration apparatus.

BRIEF DESCRIPTION OF THE DRAWINGS

The invention may be better understood from the following detailed description of specific embodiments as illustrated schematically in the accompanying drawings in which.

DETAILED DESCRIPTION OF ILLUSTRATED EMBODIMENTS

Figure 1:
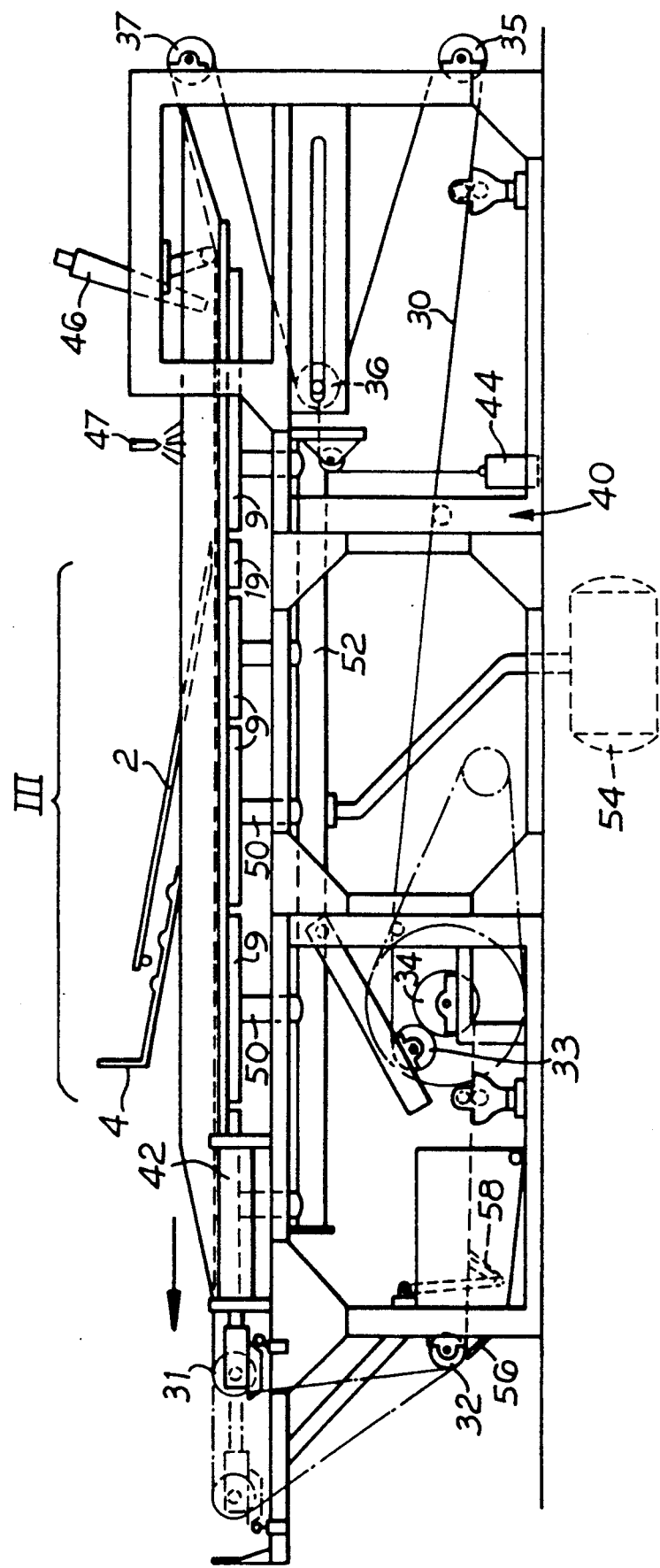
FIG. 1 is a side view of one embodiment of apparatus in accordance with the present invention.

In the first version, shown in FIG. 1, an endless filter belt 30 is guided around various rollers 31 to 37, which are supported by a framework 40, to provide a substantially horizontal upper run 1 and a power returned run. The upper run 1 is moved stepwise in the direction indicated by the arrow by reciprocation of the downstream roller 31 by a cylinder 42. When the roller 31 is pushed forwards to the position shown in broken lines, the upper run progresses by a fixed distance. Reverse movement of the lower run is prevented by a one way device, e.g. a one way drive or a pawl and rachet arrangement, provided on the roller pair 33, 34. Tensioning roller 36 moves to the right in irs guide slot upon the aforesaid forward movement of the roller 31. When the roller 31 is pulled back again, slack is taken up by movement of the tensioning roller 36 to the left under influence of weight 44.

Each time, after the upper run 1 has moved forward, slurry to be filtered is supplied thereto at the downstream end by feed means 46. During stepwise progression of the upper run 1, the belt 30 and the slurry deposited thereon are washed by sprays 47 and are moved over successive vacuum boxes 9. The vacuum boxes 9 are connected by respective pipes 50 to a manifold 52, which is connected to a vacuum source, e.g. a vacuum pump 54. The vacuum boxes 9 and hence the slurry on the upper run 1 are subject to vacuum while the belt 30 is stationary. Each time the belt 30 is progressed, the vacuum is shut off by any suitable valve arrangement (not shown). Once the belt 30 stops again, i.e. when the roller 31 reaches its extreme forward position, the vacuum is reapplied.

By the end of the upper run 1, the slurry should have had all liquid removed so that a solid filter cake remains on the belt 30 for removal by a doctor blade 56, prior to washing at 58.

Figure 2:
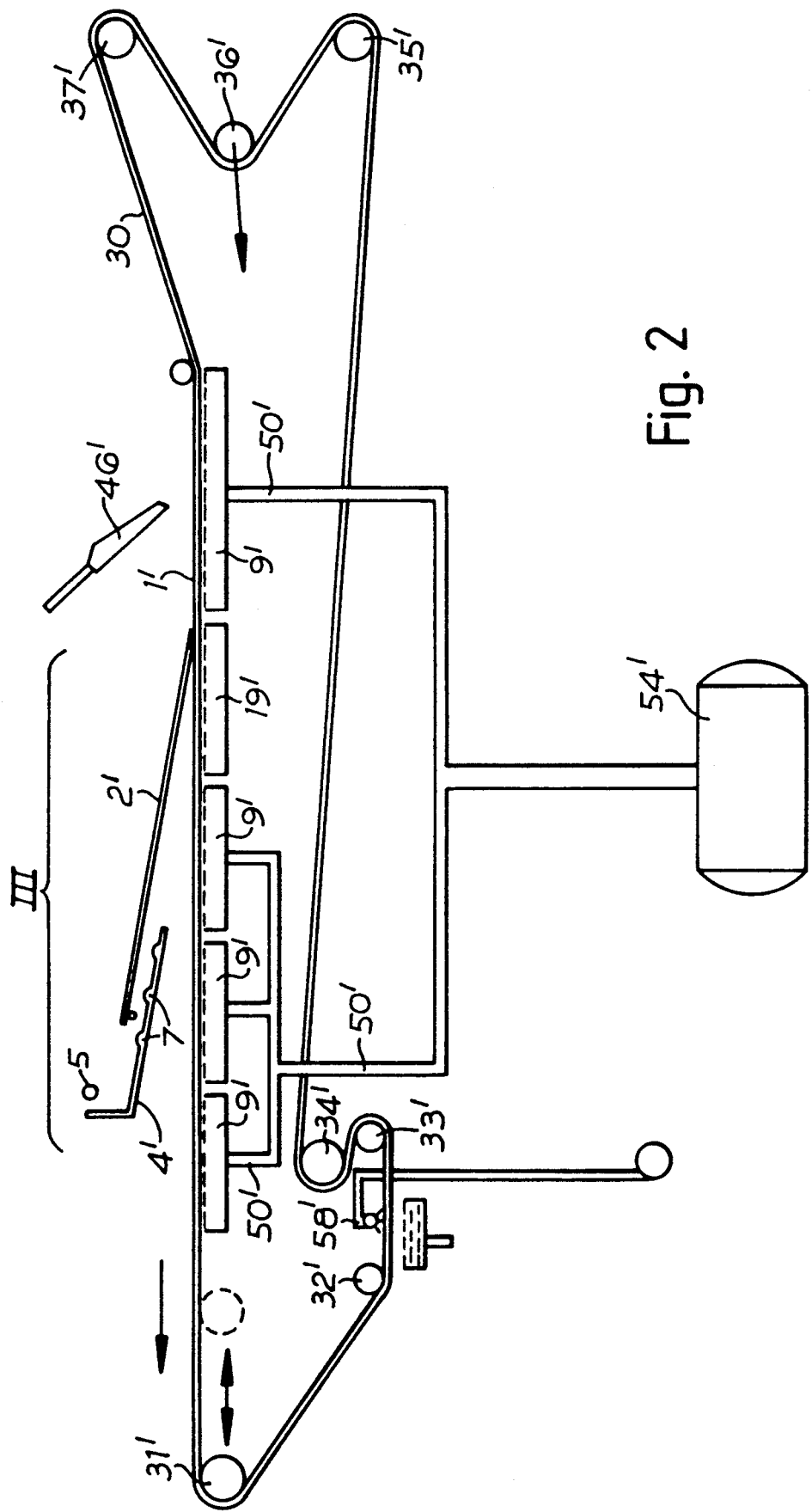
FIG. 2 is a more diagrammatic side view of another embodiment of apparatus in accordance with the present invention.

The second version of the filter apparatus, as shown in FIG. 2 is illustrated more schematically. It operates in an analogous manner to the FIG. 1 example so will not be described in detail. The parts shown are indicated by the corresponding reference numbers used in FIG. 1 surmounted by '.

Figure 3:
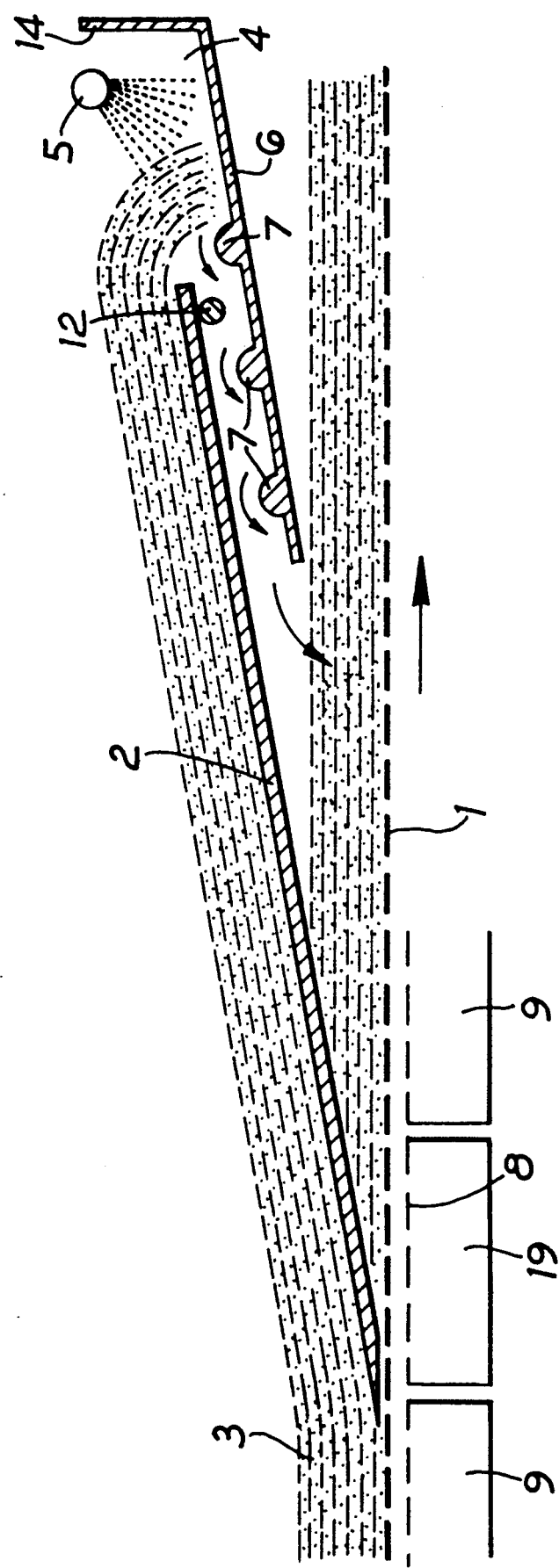
FIG. 3 is a greatly enlarged fragmentary cross-section of the portion of apparatus indicated by reference III in FIGS. 1 and 2, when viewed from the other direction (i.e. turned through 180° compared to FIGS. 1 and 2.

Reference is now made to FIG. 3 in which only the relevant portion III of the substantially horizontal upper run of the endless filter belt 30 of FIG. 1 (or 30' of FIG. 2) is shown. It will be noted that the upper run 1 is supported upon the vacuum boxes 9 by way of a grid 8.

An inclined plate 2 is arranged above this particular section III of the belt upper run 1. This plate 2 is pivotally mounted by means of a pivot shaft 12 adjacent its upper edge, the ends of said shaft 12 being journalled in supports (not shown) at respective sides of the belt upper run 1. The lower edge of the plate 2 then rests lightly on the belt surface. The angle of inclination of the plate 2 relative to the belt surface is about 10°. A box 19 lying immediately below and to the downstream side of the lower end of the plate 2 does not have a connection to vacuum, i.e. there is no suction pressure applied in this region.

At the upper end of the plate 2 there is mounted a so-called re-slurry trough 4, in the form of a receptacle having a front wall 14 and a downwardly sloping base 6 which extends partially below the plate 2, substantially parallel therewith. A plurality of upstanding baffles 7 are provided on the base 6, and nozzles 5 for spraying liquid are mounted above the trough 4.

In use, as the belt 30 is progressed when the filter cake layer (indicated in FIG. 3 by reference numeral 3) deposited on the belt upper run 1 reaches the plate 2 it is deflected thereby and owing to the successive forward motion of the belt 1 it is pushed up the upper surface of the plate 2 until it drops from the upper end into the trough 4. Here, additional washing liquor is supplied from the nozzles 5 and mixes with the cake as it travels down the base 6 and over or through the baffles 7, the presence of which facilitates mixing and slurry formation by temporary restraining the downward flow of slurry, and/or changing the flow pattern thereof and/or spreading same.

The fresh, washed slurry is deposited on the belt 1 again immediately below and behind (downstream of) the plate 2, as shown.

Figure 4:
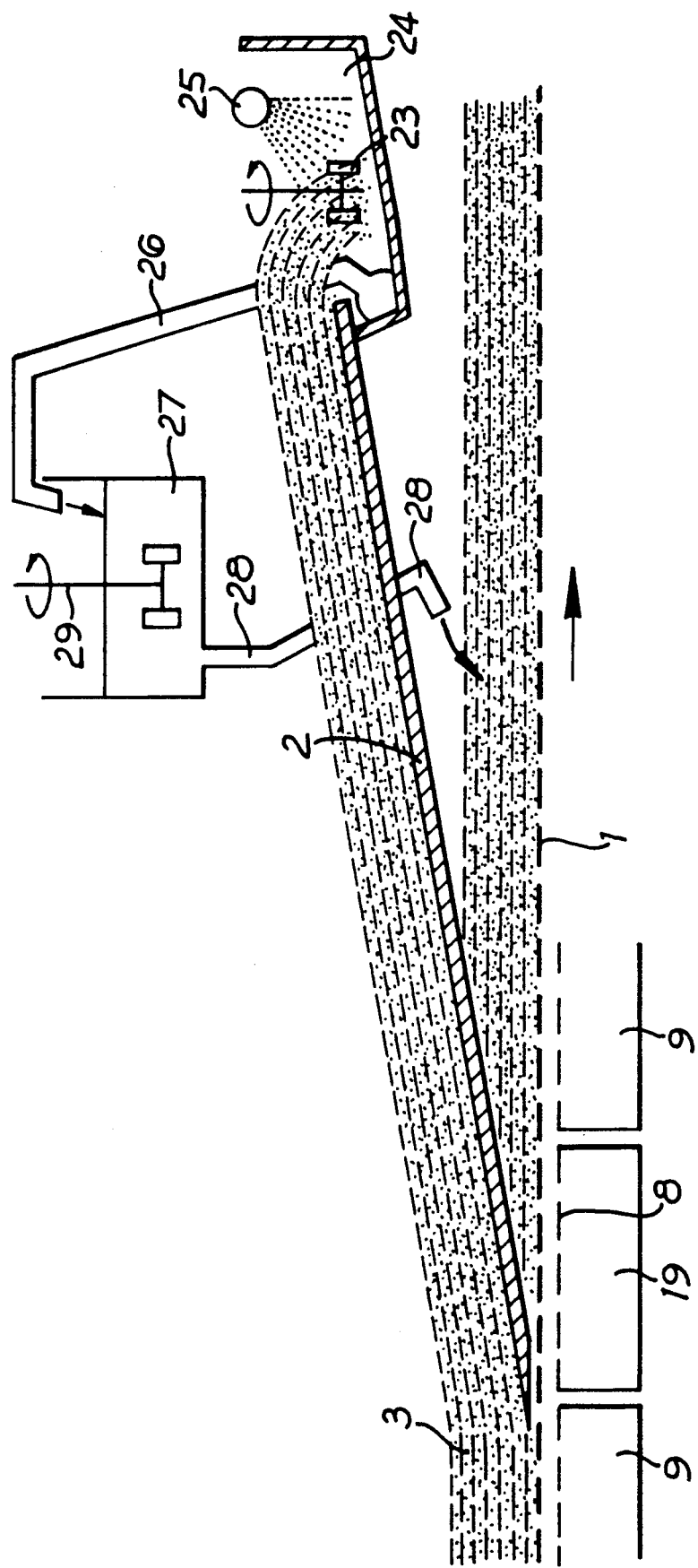
FIG. 4 is a view comparable with FIG. 3 of an alternative arrangement for removal of re-slurried filter cake to a reservoir for prolonged leaching prior to return to the belt, which could be used in place of the FIG. 3 arrangement in FIG. 1 or FIG. 2.

FIG. 4 illustrates a modified arrangement where a prolonged residence time is required for leaching of wash liquor from the re-slurried cake. In this case, a receptacle 24 is provided below the top edge of the plate for filter cake to drop into. Nozzles 25 supply wash liquor and a rotary agitator 23 is provided to mix the filter cake with the liquor and reslurry same. The reslurried cake is then pumped via a duct 26 to a reservoir 27, where it may be held for several hours before being pumped back via duct 28 and re-deposited on the belt upper run 1 behind the plate 2. A stirrer 29 may also be provided in the reservoir 27.

In other embodiments of the invention belt movement and vacuum application may be continuous.

I claim:

1. Vacuum filtration apparatus comprising an endless filter belt, guide means for guiding said belt around a path so as to provide an upper run, feed means for feeding slurry to be filtered onto said upper run, vacuum means for drawing filtrate through said belt to form a filter cake thereon, and drive means for moving said belt, wherein the improvement comprises a first plate mounted in inclined disposition above said belt upper run and having a lower end directed upstream relative to movement of said belt upper run and extending across said belt and an upper end directed downstream so that as said drive means progresses said filter cake moves upwards over said plate, means for washing the cake located immediately below the upper end of said plate, and means for returning the washed cake from said washing means to said belt upper run downstream of said plate.

2. Apparatus as set forth in claim 1 including means for pivotally mounting said plate above said belt upper run such that its lower end rests upon said belt upper run.

3. Apparatus as set forth in claim 1 wherein a box having no connections to vacuum is provided immediately below and to the downstream side of the lower end of said plate.

4. Apparatus as set forth in claim 1 wherein said plate is inclined at an angle of about 10° to the horizontal.

5. Apparatus as set forth in claim 1 wherein said plate is inclined at an angle of about 10° relative to the upper run of said belt.

6. Apparatus as set forth in claim 1 wherein said means for washing the filter cake comprises a receptacle located immediately below the upper end of said plate for the cake to drop into, and means for spraying liquid into said receptacle to form a slurry of the cake.

7. Apparatus as set forth in claim 6 wherein said receptacle is provided with baffle means.

8. Apparatus as set forth in claim 6 wherein said receptacle is provided with agitation means.

9. Apparatus as set forth in claim 6 wherein said receptacle and means for returning comprises a second inclined plate arranged below said first mentioned plate to return the slurry to said belt upper run at a location underneath said first mentioned plate.

10. Apparatus as set forth in claim 9 wherein said second plate is provided with baffle means.

11. Vacuum filtration apparatus comprising an endless filter belt, guide means for guiding said belt around a path so as to provide an upper run, feed means for feeding slurry to be filtered onto said upper run, vacuum means for drawing filtrate through said belt to form a filter cake thereon, and drive means for moving said belt, wherein the improvement comprises a first plate mounted in inclined disposition above said belt upper run and having a lower end directed upstream relative to movement of said belt upper run and extending across said belt and an upper end directed downstream so that as said drive means progresses said filter cake moves upwards over said plate, means for transporting the cake to a reservoir, said means for transporting being located directly below the upper end of said plate, and means for returning the cake from the reservoir to said belt upper run downstream of said plate.

12. Apparatus as set forth in claim 11 including means for pivotally mounting said plate above said belt upper run such that its lower end rests upon said belt upper run.

13. Apparatus as set forth in claim 11 wherein a box having no connections to vacuum is provided immediately below and to the downstream side of the lower end of said plate.

14. Apparatus as set forth in claim 11 wherein said plate is inclined at an angle of about 10° to the horizontal.

15. Apparatus as set forth in claim 11 wherein said plate is inclined at an angle of about 10° relative to the upper run of said belt.

16. Apparatus as set forth in claim 11 wherein said means for transporting comprises receptacle located immediately below the upper end of said plate for the cake to drop into, means for spraying liquid into said receptacle to form a slurry of the cake, means for pumping the slurry formed in said receptacle to the reservoir, and duct means for transporting the slurry from the reservoir to said belt upper run behind said inclined plate.

17. Apparatus as set forth in claim 16 wherein agitation means are provided in the reservoir.

18. Apparatus as set forth in claim 16 wherein agitation means are provided in said receptacle.

* * * * *